Figure 1:
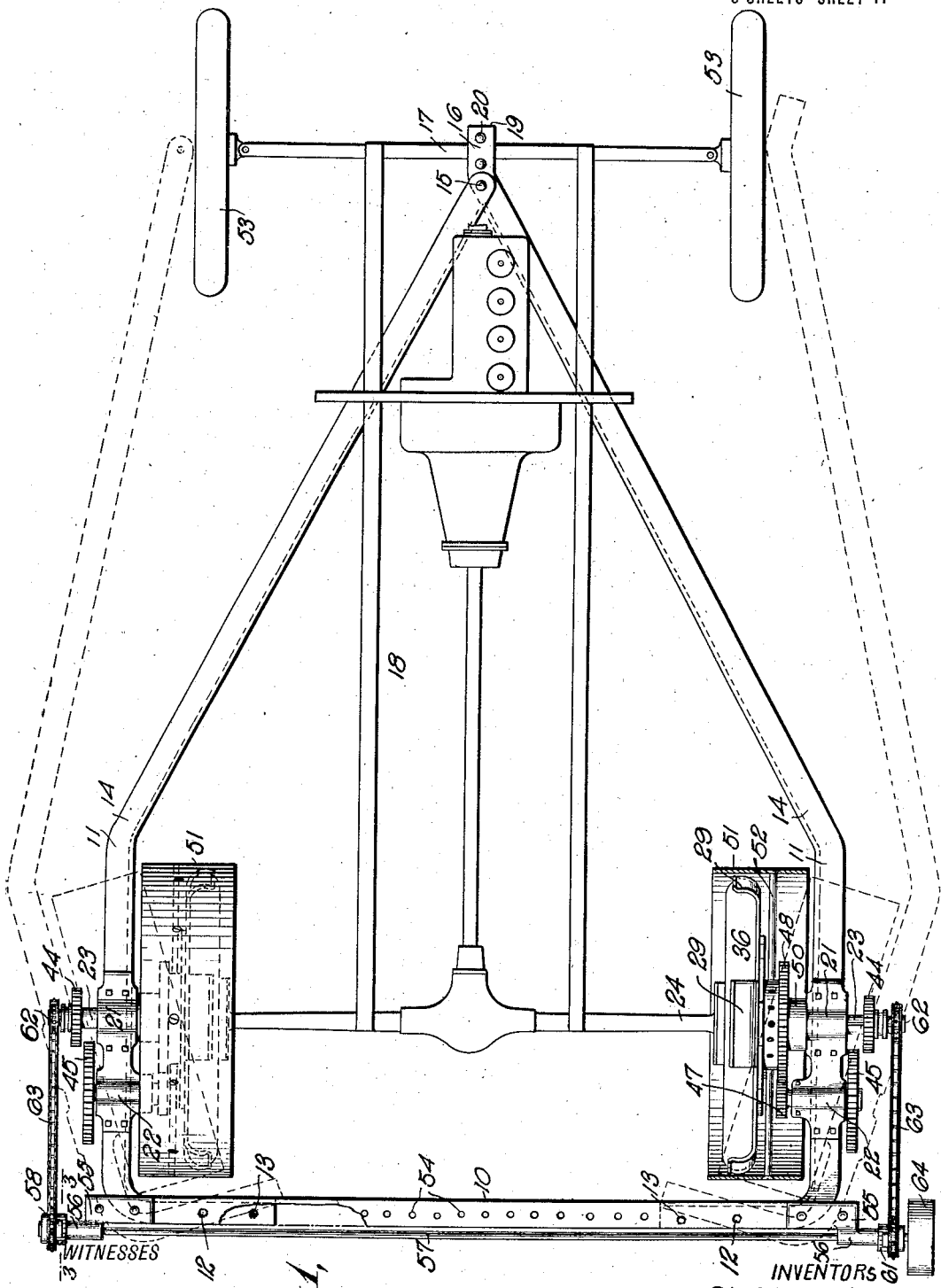

H. BICKFORD & C. L. OLMSTEAD.
POWER ATTACHMENT FOR AUTOMOBILES.
APPLICATION FILED NOV. 19, 1915.

1,191,654.

Patented July 18, 1916.
3 SHEETS—SHEET 1.

WITNESSES
INVENTORS
C. L. Olmstead
H. Bickford
BY
ATTORNEYS

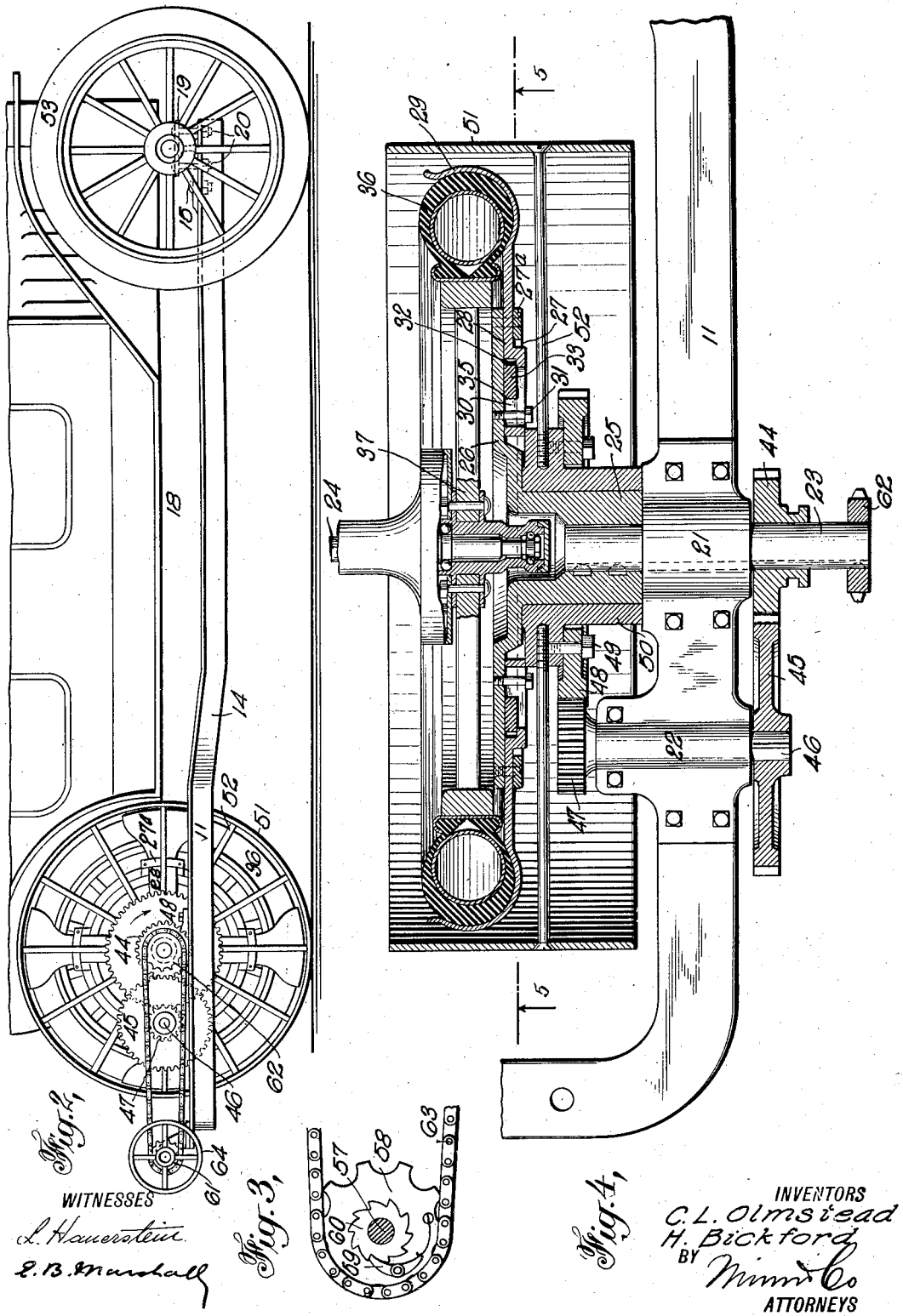

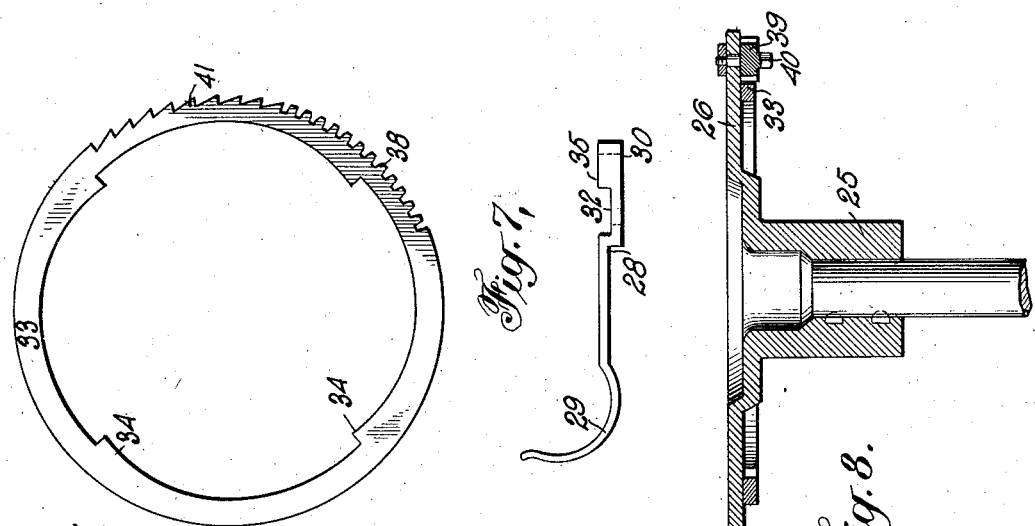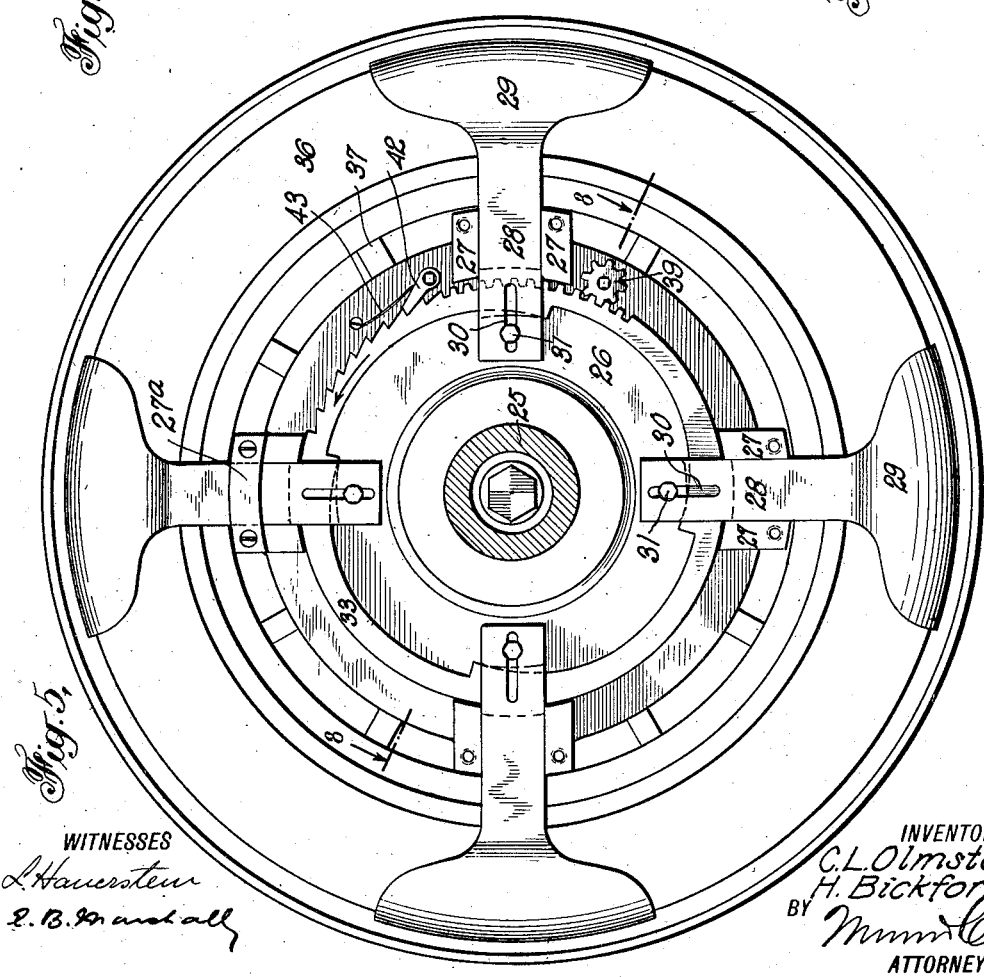

UNITED STATES PATENT OFFICE.

HEZEKIAH BICKFORD AND CHARLES LEWIS OLMSTEAD, OF GREAT FALLS, MONTANA.

POWER ATTACHMENT FOR AUTOMOBILES.

1,191,654. Specification of Letters Patent. Patented July 18, 1916.

Application filed November 19, 1915. Serial No. 62,320.

*To all whom it may concern:*

Be it known that we, HEZEKIAH BICKFORD and CHARLES LEWIS OLMSTEAD, both citizens of the United States, and residents of Great Falls, in the county of Cascade and State of Montana, have invented a new and Improved Power Attachment for Automobiles, of which the following is a full, clear, and exact description.

Our invention has for its object to provide a power attachment for automobiles having means for clamping shafts to the power wheels of an automobile, traction wheels being disposed around the automobile wheels, with which the shafts are connected by gearing.

Other objects of the invention are to provide a detachable frame having bearings in which the shafts are journaled, and for operatively connecting the said shafts with a shaft journaled in the bearings in the frame, to which a pulley is secured.

Additional objects of the invention will appear in the following specification in which the preferred form of the invention is described.

In the drawings similar reference characters refer to similar parts in all the views, in which—

Figure 1 is a plan view partially in section, showing how the power attachment is applied to an automobile; Fig. 2 is a side elevation of an automobile provided with the power attachment; Fig. 3 is an enlarged sectional view on the line 3—3 of Fig. 1; Fig. 4 is an enlarged sectional view illustrating how one of the traction wheels is connected with the power wheel of an automobile; Fig. 5 is a sectional view on the line 5—5 of Fig. 4; Fig. 6 is a view showing an annular cam member; Fig. 7 is a view showing one of the tire clamps; and Fig. 8 is a sectional view on the line 8—8 of Fig. 5.

By referring to the drawings, it will be seen that a transverse frame member 10 is provided, to which are pivoted longitudinally extending frame members 11, these frame members 11 being pivoted at 12, and being held in position relatively to the transverse frame member 10 by the bolts 13. The longitudinally extending frame members 11 converge at 14, so that they may be bolted together at 15, and the extending portion 16 of one of the frame members 11 may be secured to the front axle 17 of the automobile chassis 18 by a clamp 19 and bolts 20, or by any other suitable means.

Each of the longitudinally extending frame members 11 has a bearing 21 and a second bearing 22, shafts 23 being journaled in the bearings 21, these shafts 23 being adapted to be disposed substantially in registry with the rear axle 24 of the automobile chassis 18. At the inner sides of the bearings 21, the shafts 23 are disposed in and are secured to sleeves 25, from which extend spiders 26, the said spiders 26 having lugs 27 which are spaced apart to form guideways for the shanks 28 of clamps 29. The shanks 28 of the said clamps 29 have slots 30 in which guide pins 31 are disposed. In the shank 28 of each of the clamps 29 there is a transverse recess 32, a ring or annular member 33 being disposed in these recesses 32 and being provided with cams 34 for engaging the shoulders 35 at the inner ends of the recesses 32. It will therefore be seen that with the rotation of the annular members 33, the cams 34 will engage the shoulders 35 to press the clamps 29 inwardly, and as these clamps 29 embrace the tires 36 of the power wheels 37 mounted on the rear axle 24, the clamps 29 together with the spiders 26 will rotate with the automobile wheels 37, thereby rotating the sleeves 25 and the shafts 23 which are keyed thereto. As a means for rotating the annular cam members 33, we provide a portion of the annular members 33 with gear teeth 38, with which meshes a gear 39 journaled to the spider 26 and having an angular head 40 which may be engaged by a wrench to turn the gear 39 for rotating the annular cam members 33, as described. Portions of the annular cam members 33 are provided with ratchet teeth 41 which are engaged by pawls 42 mounted on the spiders 26, these pawls 42 being held in engagement with the ratchet teeth 41 by springs 43.

Keyed to slide on the shafts 23 at the outer sides of the bearings 21 there are gears 44, which, when pressed close to the bearings 21, mesh with gears 45 secured to shafts 46 journaled in the bearings 22. At the inner sides of these bearings 22 gears 47 are secured to the shafts 46, these gears 47 meshing with gears 48 which are secured by bolts 49 to the hubs 50 which are mounted on the sleeves 25. Traction wheels 51 are disposed around the automobile wheels 37, and these traction wheels 51 are connected with the hubs 50 by spokes 52. It will therefore be seen that with the rotation of the automobile wheels 37, the shafts 23 will be rotated by means of the clamps 29, the spiders 26 and the sleeves 25; and that with the rotation of the shafts 23, the hub 50 together with the spokes 52 and the traction wheels 51 will be rotated by the gearing which has been described.

When the bolts 13, 15 and 20 have been removed, the longitudinally extending frame members 11 may be moved outwardly, as indicated by the dotted lines in Fig. 1 of the drawings, so that an automobile chassis may be backed to the position indicated by the full lines in the said figure. When this has been done, the forward ends of the longitudinally extending frame members 11 are pushed inwardly so that they will be disposed at the inner sides of the front wheels 53 of the automobile chassis 18. The automobile chassis may then be backed still farther, if necessary, so that its wheels 37 will be disposed substantially in position relatively to the traction wheels 51. The rear axle 24 is then raised by a jack, or by other means, until the clamps 29 are in position to clamp the automobile tires 36. The frame members 11 are then moved to the position indicated in full lines in Fig. 1 of the drawings, and the bolts 13 are inserted to hold the rearwardly bent arms of the frame members relatively to the transverse frame member 10. The bolts 15 and 20 are then placed in position to hold the frame members 11 as indicated in the full lines in Fig. 1 of the drawings, and secured to the front axle 17 of the chassis. The annular cam members 33 are then turned by the means which have been described, so that the clamps 29 may be fitted over the automobile tires 36, after which the clamps 29 are drawn inwardly by means of the annular cam members 33.

When the gears 44 are disposed inwardly, as shown in Fig. 4 of the drawings, and in mesh with the gears 45, a traction car is provided which may be used for a variety of purposes, it being possible to secure farming or other machinery to the transverse frame member 10, which serves as a traction bar, it being provided with openings 54, so that the machinery may be conveniently secured to the bar at any desired position.

Detachably secured to the transverse frame member 10, there are brackets 55 having bearings 56 in which a shaft 57 is journaled. A sprocket wheel 58 is mounted at one end of the shaft 57, and has secured to it a pawl 59 for engaging a ratchet wheel 60 secured to the shaft 57. At the other end of the shaft 57 a sprocket wheel 61 is secured, the sprocket wheels 58 and 61 being connected with sprocket wheels 62, mounted on the shafts 23 by sprocket chains 63. The pawl 59 and ratchet 60 are provided so that both ends of the shaft 57 will have an even rotation, without reference to the differential of the automobile chassis.

It will of course be understood that the gears 44 may be moved outwardly on the shafts 23 to disengage them from the gears 45, so that the shaft 57 may be rotated without the rotation of the traction wheels 51, it being possible, when the shaft 57 is rotated in this manner, to couple up the said shaft 57 by means of its pulley 64 with any machinery which it may be desired to drive.

Having thus described our invention, what we claim as new and desire to secure by Letters Patent is:

1. In a power attachment for automobiles, a frame adapted to be secured to an automobile and provided with bearings, a shaft journaled in the bearings, clamps for engaging the power wheels of the automobile, means for securing the clamps to the shafts, traction wheels disposed co-axially with the shafts, and gearing connecting the shafts with the traction wheels.

2. In a power attachment for automobiles, a frame adapted to be secured to an automobile and provided with bearings, spiders, shafts secured to the spiders and journaled in the bearings, clamps for engaging the power wheels of the automobile, means for adjustably securing the clamps to the spiders, traction wheels, and gearing connecting the shafts with the traction wheels.

3. In a power attachment for automobiles, a frame adapted to be secured to an automobile and provided with bearings, spiders, shafts journaled in the bearings and secured for rotating with the spiders, radially disposed clamps for engaging the power wheels of the automobile and provided with shoulders, guide means connecting the clamps with the spiders, means for engaging the shoulders for moving the clamps relatively to each other, traction wheels, and gearing connecting the shafts with the traction wheels.

4. In a power attachment for automobiles, a frame adapted to be secured to an automobile and provided with bearings, spiders, shafts secured for rotating with the spiders and journaled in the bearings, radially disposed clamps for engaging the power wheels of the automobile and provided with shoulders, guide means connecting the clamps with the spiders, annular members having cams for engaging the shoulders for moving the clamps relatively to each other, traction wheels, and gearing connecting the shafts with the traction wheels.

5. In a power attachment for automobiles, a frame adapted to be secured to an automobile and provided with bearings, spiders, shafts secured for rotating with the spiders and journaled in the bearings, radially disposed clamps for engaging the power wheels of the automobile and provided with shoulders, guide means connecting the clamps with the spiders, annular members having cams for engaging the shoulders for moving the clamps relatively to each other, there being ratchet and gear teeth on the annular cam members, pawls on the spiders engaging the ratchet teeth, gears journaled to the spiders and meshing with the gear teeth, means for rotating the gears, traction wheels, and gearing connecting the shafts with the traction wheels for rotating the latter.

6. In a power attachment for automobiles, a frame adapted to be secured to an automobile and provided with bearings, spiders, shafts journaled in the bearings and secured for rotating with the spiders, clamps for engaging the power wheels of an automobile and having transverse recesses, guide means connecting the clamps with the spiders, annular members disposed in the recesses in the clamps, the annular members having cams for engaging the clamps at the recesses for moving the clamps relatively to each other, means for rotating the cam members, traction wheels, and gearing connecting the shafts with the traction wheels.

7. In a power attachment for automobiles, a spider, clamps mounted on the spider for engaging a power wheel of an automobile, a traction wheel for disposal around the said power wheel, gearing with which the spider is connected, and means by which the gearing is adapted to rotate the traction wheel.

8. In a power attachment for automobiles, a spider, clamps for embracing a power wheel of an automobile and provided with shoulders, guide means connecting the clamps with the spider, means for engaging the shoulders on the clamps for moving the clamps relatively to each other, a traction wheel for disposal around the said power wheel, gearing with which the spider is connected, and means by which the gearing is adapted to rotate the traction wheel.

9. In a power attachment for automobiles, a spider, clamps for embracing a power wheel of an automobile and provided with shoulders, an annular member having a cam for engaging the shoulders, guide means connecting the clamps with the spider, a traction wheel for disposal around the said power wheel, gearing with which the spider is connected, and means by which the gearing is adapted to rotate the traction wheel.

10. In a power attachment for automobiles, a spider, clamps for embracing a power wheel of an automobile, the clamps being provided with shoulders, an annular member having cams for engaging the shoulders on the clamps, there being ratchet and gear teeth on the annular member, a pawl on the spider engaging the ratchet teeth, a gear journaled to the spider and meshing with the gear teeth of the annular member, means for rotating the gear, a traction wheel for disposal around the said power wheel, gearing with which the spider is connected, and means by which the gearing is adapted to rotate the traction wheel.

11. In a power attachment for automobiles, a frame having two bearings, a shaft journaled in one of the bearings, a spider secured to the shaft, clamps secured to the spider for embracing a power wheel of an automobile, a hub mounted on the shaft, a traction wheel for disposal around the said power wheel, means connecting the hub with the traction wheel for rotating the latter, a gear secured to the hub, a gear secured to the shaft, a second shaft journaled in the other bearing on the frame, and gearing on the second mentioned shaft meshing with the two first mentioned gears.

12. In a power attachment for automobiles, a transverse frame member, two longitudinally extending frame members secured to the transverse frame member and adapted to be secured at their forward ends to an automobile, bearings in the longitudinally extending frame members, shafts journaled in the bearings, clamps for embracing the power wheels of the automobile, means for securing the clamps to the shafts, traction wheels for disposal co-axially with the shafts, and gearing connecting the shafts with the traction wheels.

13. In a power attachment for automobiles, a transverse frame member, two longitudinally extending frame members secured to the transverse frame member and adapted to be secured at their forward ends to an automobile, bearings in the longitudinally extending frame members, shafts journaled in the bearings, clamps for engaging the power wheels of the automobile, means for securing the clamps to the shafts at the inner sides of the longitudinally extending frame members, traction wheels disposed co-axially with the shafts and at the inner sides of the longitudinally extending frame members, and gearing connecting the shafts with the traction wheels.

14. In a power attachment for automobiles, a transverse frame member, two longitudinally extending frame members secured to the transverse frame member at their rear ends and disposed forwardly and substantially parallel with each other for a distance and then converging to a point where they may be secured to the forward part of an automobile, two traction wheels adapted to be disposed around the power wheels of the automobile, and means mounted on the frame for connecting the power wheels with the traction wheels for rotating the latter.

15. In a power attachment for automobiles, a frame having two parallel portions and adapted to be secured to an automobile, two traction wheels adapted to be disposed around the power wheels of the automobile, and means mounted on the frame for connecting the power wheels with the traction wheels for rotating the latter.

16. In a power attachment for automobiles, a transverse frame member, two longitudinally extending frame members pivoted to the transverse frame member and adapted to be secured at their forward ends to an automobile, means for securing the longitudinally extending frame members relatively to the transverse frame member, two traction wheels adapted to be disposed around the power wheels of the automobile, and means mounted on the longitudinally extending frame members for conecting the power wheels with the traction wheels for rotating the latter.

17. In a power attachment for automobiles, a transverse frame member, two longitudinally extending frame members secured to the transverse frame member and adapted to be secured at their forward end to an automobile, bearings in the longitudinally extending frame members, shafts journaled in the bearings, clamps for embracing the power wheels of the automobile, means for securing the clamps to the shafts, traction wheels for disposal co-axially with the shafts, gearing connecting the shafts with the traction wheels, another shaft journaled in bearings in the transverse frame member, a pulley secured to the last mentioned shaft, and means connecting the first shafts with the said other shaft for rotating the latter.

18. In a power attachment for automobiles, a frame provided with a bearing, means for detachably securing the frame to an automobile with the axis of the bearing substantially in alinement with the axis of a rotatable power member on the automobile, a shaft journaled in the bearing, means for securing the shaft to the power member, a traction wheel, and gearing connecting the shaft with the traction wheel for the purpose specified.

19. In a power attachment for automobiles, a frame having a bearing, means for detachably securing the frame to an automobile, a shaft journaled in the bearing, means for securing the shaft to a power member of the automobile, a traction wheel normally disposed around the power member, and gearing connecting the shaft with the traction wheel.

20. In a power attachment for automobiles, two frame members pivoted together with portions spaced apart and provided with bearings, means for detachably securing the frame members to the sides of an automobile, shafts journaled in the bearings, means for connecting the shafts with power members of the automobile, two traction wheels, and means by which the shafts are adapted to rotate the traction wheels.

21. In a power attachment for automobiles, a frame provided with a bearing, means for detachably securing the frame to an automobile, a shaft journaled in the bearing, means for securing the shaft to a power member of the automobile, a traction wheel disposed with its axis substantially in line with the axis of the power member, and gearing connecting the shaft with the traction wheel.

22. In a power attachment for automobiles, a frame, means for detachably securing the frame to an automobile having a power member, a traction wheel mounted on the frame and disposed around the power member, and means by which the power member is adapted to rotate the traction wheel.

23. In a power attachment for automobiles, a frame, means for detachably securing the frame to an automobile having a power member, a traction wheel mounted on the frame and disposed with its axis substantially in alinement with the axis of the power member, and means by which the power member is adapted to rotate the traction wheel.

24. In a power attachment for automobiles, a frame, means for detachably securing the frame to an automobile with a portion of the frame disposed at the outer side of a power member of the automobile, a traction wheel rotatably mounted on the said portion of the frame, and means by which the power member is adapted to rotate the traction wheel.

25. In a power attachment for automobiles, two frame members pivoted together with portions normally disposed at the outer sides of power members on an automobile, means for detachably securing the frame members to the automobile, traction wheels rotatably mounted on the said portions of the frame members, and means by which the power members are adapted to rotate the traction wheels.

26. In a power attachment for automobiles, a frame adapted to be secured to an automobile, and having portions spaced apart for disposal at the outer sides of power members of the automobile, traction wheels rotatably mounted on the said portions of the frame members, and means by which the power members are adapted to rotate the traction wheels.

27. In a power attachment for automobiles, a frame adapted to be secured to an automobile and having portions spaced apart for disposal at the outer sides of power members of the automobile, traction wheels disposed around the power members, and means mounted on the frame by which the power members are adapted to rotate the traction wheels.

In testimony whereof we have signed our names to this specification in the presence of two subscribing witnesses.

HEZEKIAH BICKFORD.
CHARLES LEWIS OLMSTEAD.

Witnesses:
 LEO P. MCMEEL,
 FRED L. HILL.